United States Patent
Liu et al.

(10) Patent No.: US 12,386,038 B2
(45) Date of Patent: Aug. 12, 2025

(54) RADAR SYSTEM USING A MACHINE-LEARNED MODEL FOR IDENTIFYING A NUMBER OF OBJECTS

(71) Applicant: Aptiv Technologies AG, Schaffhausen (CH)

(72) Inventors: Baokun Liu, Kokomo, IN (US); Xiuzhang Cai, Carmel, IN (US); Yi Feng, Westfield, IN (US); Benjamin Dilsaver, Russiaville, IN (US)

(73) Assignee: Aptiv Technologies AG, Schaffhausen (CH)

( * ) Notice: Subject to any disclaimer, the term of this patent is extended or adjusted under 35 U.S.C. 154(b) by 336 days.

(21) Appl. No.: 18/331,145

(22) Filed: Jun. 7, 2023

(65) Prior Publication Data

US 2024/0410978 A1 Dec. 12, 2024

(51) Int. Cl.
*G01S 7/41* (2006.01)
*G01S 13/56* (2006.01)
*G01S 13/931* (2020.01)

(52) U.S. Cl.
CPC .............. *G01S 7/412* (2013.01); *G01S 13/56* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 10,976,410 B1 * | 4/2021 | Wang | .................... | G01S 13/726 |
| 12,291,229 B2 * | 5/2025 | Traa | ...................... | G01S 13/584 |
| 2019/0391251 A1 * | 12/2019 | Bharadwaj, Jr. | ........ | G01S 13/42 |
| 2021/0223376 A1 * | 7/2021 | Luo | ....................... | G01S 13/003 |
| 2021/0293927 A1 * | 9/2021 | Tyagi | ..................... | G01S 7/412 |
| 2022/0066020 A1 * | 3/2022 | Fu | ............................ | G01S 17/86 |
| 2022/0196798 A1 * | 6/2022 | Chen | ...................... | G01S 7/354 |
| 2022/0214425 A1 * | 7/2022 | Yoffe | .................... | G01S 13/584 |
| 2022/0242443 A1 * | 8/2022 | Traa | ...................... | G01S 13/584 |
| 2022/0244373 A1 * | 8/2022 | Lessmann | .............. | G01S 7/356 |
| 2022/0260701 A1 * | 8/2022 | Doerr | ................... | G01S 13/584 |
| 2022/0342039 A1 * | 10/2022 | Eschbaumer | .......... | G01S 7/415 |

(Continued)

OTHER PUBLICATIONS

Extended European Search Report regarding European Patent Application No. 23186601.3, dated Sep. 23, 2024.

*Primary Examiner* — Peter M Bythrow
(74) *Attorney, Agent, or Firm* — Harness, Dickey & Pierce, P.L.C.

(57) ABSTRACT

This document describes techniques and systems related to a radar system using a machine-learned model to identify the number of objects within each range-Doppler bin. For example, the radar system includes a processor that obtains radar data associated with objects and processes the radar data to generate beam vectors. The processor then uses a machine-learned model to identify the number of objects within each range-Doppler bin using extracted features (e.g., magnitude variation, signal-to-noise ratio, subarray beam vector correlations) of the beam vectors. The processor selects a particular angle-finding technique based on whether a single object or multiple objects are identified. In this way, the described systems and techniques more accurately identify the number of object in each range-Doppler bin, thus improving the computational efficiency and robustness of subsequent angle finding.

20 Claims, 7 Drawing Sheets

(56) References Cited

U.S. PATENT DOCUMENTS

| | | | | |
|---|---|---|---|---|
| 2023/0168361 A1* | 6/2023 | Guo | ................. | G01S 7/415 |
| | | | | 342/104 |
| 2023/0236314 A1* | 7/2023 | Jin | ................. | G01S 7/356 |
| | | | | 342/70 |
| 2023/0326215 A1* | 10/2023 | Yu | ................. | G06V 10/62 |
| | | | | 701/28 |
| 2023/0366983 A1* | 11/2023 | Garg | ................. | G06N 3/04 |
| 2024/0103151 A1* | 3/2024 | Gu | ................. | H01Q 1/3233 |
| 2024/0391486 A1* | 11/2024 | Kellman | ................. | G01S 13/505 |

* cited by examiner

RADAR SYSTEM USING A MACHINE-LEARNED MODEL FOR IDENTIFYING A NUMBER OF OBJECTS

BACKGROUND

Many vehicles use radar systems to detect and track objects in the surrounding environment. Advanced driving assistance systems (ADAS) (e.g., adaptive cruise control, lane change assist, and emergency braking) rely on radar data, including ranges and azimuth angles associated with objects, to monitor and respond to detected objects. Some radar systems use different angle-finding algorithms depending on the number of objects in the same range-Doppler bin. For example, a Fast Fourier transform (FFT), which is computationally less expensive than many other angle-finding algorithms, is used to determine the azimuth angle associated with a single object. Other more computationally expensive algorithms (e.g., super-resolution techniques) may be used when multiple objects are in the same range-Doppler bin. Techniques to determine whether a particular range-Doppler bin includes a single object or multiple objects generally have low classification accuracy and thus may lead to computational inefficiency and angle-finding inaccuracy, which can reduce the response time or efficacy of ADAS features.

SUMMARY

This document describes techniques and systems related to a radar system using a machine-learned model to identify the number of detected objects. For example, the radar system includes one or more processors that obtain radar data associated with objects that reflect radar signals and process the radar data to generate multiple beam vectors. The processors then use a machine-learned model to identify the number of objects within each range-Doppler bin using features (e.g., magnitude variation, signal-to-noise ratio, subarray beam vector correlations) of the beam vectors. The processors then select a particular angle-finding technique based on whether a single object or multiple objects are detected within a particular range-Doppler bin. In this way, the described systems and techniques can more accurately identify the number of objects within each range-Doppler bin, thus improving the computational efficiency and robustness of subsequent angle finding.

This document also describes methods performed by the above-summarized techniques and components and other configurations of the radar system set forth herein, as well as means for performing these methods.

This Summary introduces simplified concepts related to a radar system that uses a machine-learned model for identifying a number of detected objects, further described in the Detailed Description and Drawings. This Summary is not intended to identify essential features of the claimed subject matter, nor is it intended to determine the scope of the claimed subject matter.

BRIEF DESCRIPTION OF THE DRAWINGS

The details of one or more aspects of a radar system using a machine-learned model for identifying a number of objects are described in this document with reference to the following figures. The same numbers are often used throughout the drawings to reference similar features and components.

DETAILED DESCRIPTION

Overview

Figure 1:
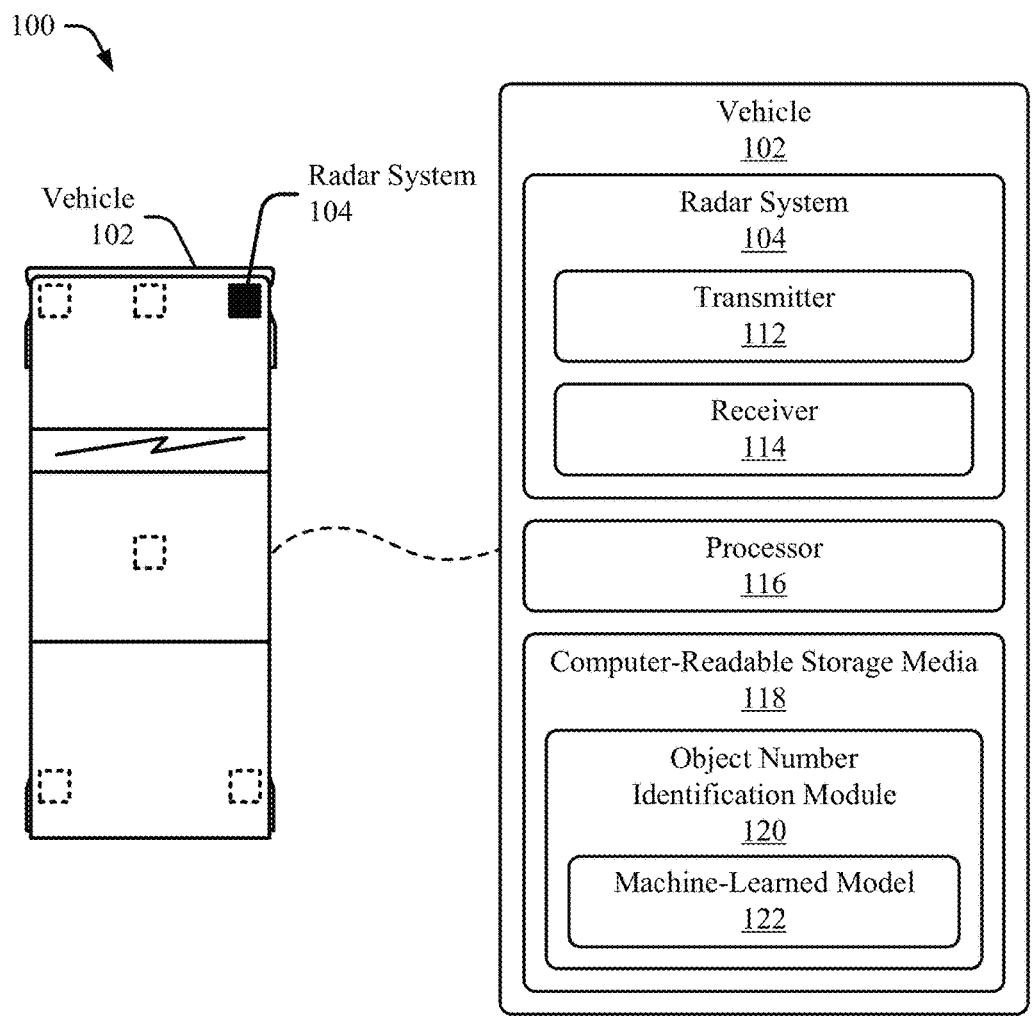
FIG. 1 illustrates an example environment in which a radar system can use a machine-learned model to identify a number of objects, in accordance with techniques of this disclosure.
Figure 1:
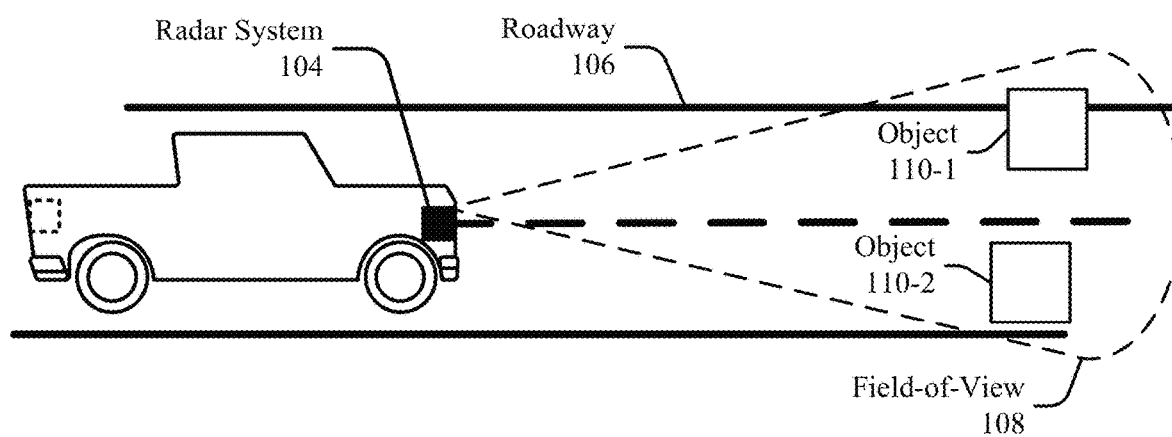

Radar systems can be configured as an important sensing technology that ADAS features (e.g., adaptive cruise control, lane change assist, emergency braking) rely on to acquire information about the surrounding environment. In particular, radar systems may provide accurate range, velocity, and angle information for objects detected in the environment surrounding a host vehicle. For example, vehicle-based systems can use radar systems to detect objects in or near a roadway and, if necessary, take necessary actions (e.g., reduce speed, change lanes) to avoid a collision.

Radar systems may use various angle-finding processes or techniques to estimate the angles (e.g., azimuth and/or elevation angles) associated with detected objects. For example, radar systems may use FFT techniques to determine the azimuth angle when a single object is detected in a particular range-Doppler bin. Such FFT techniques are generally computationally less expensive than many other angle-finding techniques (e.g., super-resolution techniques). Super-resolution techniques that are more computationally expensive are often used to determine the azimuth angles when multiple objects are detected within the same range-Doppler bin.

Radar systems generally use predetermined thresholds to distinguish single-object scenarios from multiple-object scenarios for each range-Doppler bin. For example, the magnitude variation and subarray beam vector correlations of beam vectors are compared to signal-to-noise (SNR) dependent thresholds to determine whether a particular range-Doppler bin includes a single object or multiple objects. Such approaches, however, are generally not very accurate and may be biased toward multiple-object scenarios. For example, inaccurate beam vector calibration, out-of-field-of-view detections, and poor fascia integration may result in many single-object beam vectors being incorrectly classified as having multiple objects. The classification of a single-object scenario as a multiple-target scenario may lead to false detections, angle jumps between successive frames, and/or computational inefficiencies.

In contrast, this document describes techniques and systems to accurately identify the number of objects using a machine-learned model. For example, a radar system includes one or more processors that can accurately identify the number of objects within a particular range-Doppler bin. The processors obtain radar data associated with objects that reflected radar signals and process the radar data to generate beam vectors. Each beam vector includes radar data from multiple channels of the radar system for a particular range-Doppler bin. The processors then use a machine-learned model to identify the number of objects for each range-Doppler bin. Features of the radar data (e.g., magnitude variation, SNR, subarray beam vector correlations) associated with the beam vectors are used to determine whether a single object or multiple objects are present in each range-Doppler bin. The processors then use a particular angle-finding technique for each range-Doppler bin depending on whether a single object or multiple objects are present. In this way, the described systems and techniques can increase the object-number classification accuracy score (e.g., from sixty percent to ninety-six percent), thus improving the computational efficiency of subsequent angle finding, and reducing false detections and angle jumps.

This is just one example of the described techniques and systems for a radar system to use a machine-learned model for identifying a number of objects. This document describes other examples and implementations.

Operating Environment

FIG. 1 illustrates an example environment 100 in which a radar system 104 uses a machine-learned model to identify a number of objects in accordance with the techniques of this disclosure. In the depicted environment 100, the radar system 104 is mounted to, or integrated within, a vehicle 102 traveling on a roadway 106. Within an instrumental field-of-view 108, the radar system 104 can detect one or more objects 110 (e.g., object 110-1 and object 110-2) near vehicle 102.

Although illustrated as a truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane), or spacecraft (e.g., satellite). Manufacturers can mount the radar system 104 to any moving platform, including moving machinery or robotic equipment.

In the depicted implementation, radar system 104 is mounted on the front of vehicle 102 and illuminates the objects 110. The radar system 104 can detect objects 110 from any exterior surface of the vehicle 102. For example, vehicle manufacturers can integrate, install, or attach the radar system 104 into a front portion, bumper, side mirror, headlights, rear lights, or any other interior or exterior location where the objects 110 require detection. In some cases, the vehicle 102 includes multiple radar systems 104, such as a first radar system 104-1 and a second radar system 104-2, that provide a larger instrument field-of-view 108. In general, vehicle manufacturers can design the locations of one or more radar systems 104 to provide a particular field-of-view 108 that encompasses a region of interest. Example fields-of-view 108 include a 360-degree field-of-view, one or more 180-degree fields-of-view, one or more 90-degree fields-of-view, and so forth, which can overlap into the field-of-view 108 of a particular size.

Object 110-1 and object 110-2 include one or more materials that reflect radar signals. Depending on the application, the objects 110 can represent targets of interest. For example, the objects 110 may include a parked vehicle, a moving vehicle, a roadside sign, a roadway barrier, other moving objects, or debris on roadway 106.

The radar system 104 emits electromagnetic (EM) radiation by transmitting EM signals or waveforms via antenna elements. In environment 100, the radar system 104 can detect and track objects 110 by transmitting and receiving one or more radar signals. For example, the radar system 104 can transmit EM signals between 100 and 400 gigahertz (GHz), between 4 and 100 GHz, or between approximately 70 and 80 GHz.

The radar system 104 can include a transmitter 112, which includes at least one antenna to transmit EM signals. The radar system 104 can also include a receiver 114, which includes at least one antenna to receive reflected versions of the EM signals. The transmitter 112 includes one or more components for emitting the EM signals. The receiver 114 includes one or more components for detecting the reflected EM signals. Manufacturers can incorporate the transmitter 112 and the receiver 114 together on the same integrated circuit (e.g., configured as a transceiver) or separately on different integrated circuits.

The radar system 104 also includes one or more processors 116 (e.g., an energy processing unit, an electronic control unit) and computer-readable storage media (CRM) 118. The processor 116 can be a microprocessor or a system-on-chip. Processor 116 can execute computer-executable instructions stored in the CRM 118. For example, the processor 116 can process EM energy received by the receiver 114 and determine, using an object number identification module 120, the number of objects 110 within each range-Doppler bin of radar data. The processor 116 can then use the number of identified objects 110 for each range-Doppler bin to determine which angle-finding technique to use for determining the relative location (e.g., azimuth angle, elevation angle) of each object 110. The object number identification module 120 may detect and use various features (e.g., magnitude variation, subarray beam vector correlations, SNR) associated with the radar data or beam vectors thereof. In this way, the processor 116 can improve the classification accuracy between single-target and multiple-target scenarios and use a respective angle-finding technique to improve the accuracy and computational efficiency of the angle-finding process.

The processor 116 can also generate radar data for at least one automotive system. For example, the processor 116 can control, based on processed EM energy from the receiver 114, an autonomous or semi-autonomous driving system of the vehicle 102. For example, the autonomous driving system can control the operation of vehicle 102 to maneuver around objects 110 or to slow down or come to a stop to avoid a collision with objects 110. As another example, the semi-autonomous driving system can alert an operator of the vehicle 102 that objects 110 are in roadway 106.

The object number identification module 120 receives radar data, for example, beam vectors associated with EM energy received by the receiver 114, and determines whether one or multiple objects are in a particular range-Doppler bin using features associated with the beam vectors. The object number identification module 120 uses a machine-learned model 122 to assist with the described operations and functions. The radar system 104 can implement the object number identification module 120 and the machine-learned model 122 as computer-executable instructions in the CRM 118, hardware, software, or a combination thereof that is executed by the processor 116.

The machine-learned model 122 can identify, using extracted features from the beam vectors, the number of objects 110. The machine-learned model 122 is trained to receive the beam vectors and extract features therefrom to perform object number identification. The output of the machine-learned model 122 includes an identification of the number of objects 110 for each range-Doppler bin.

The machine-learned model 122 can perform classification, clustering, tracing, and/or other tasks in some implementations. For classifications, the machine-learned model 122 can be trained using supervised learning techniques. For example, the object number identification module 120 can train the machine-learned model 122 with training data (e.g., ground truth data) that includes beam vectors of radar data labeled as single-object or multiple-object scenarios. The labels can be manually applied by engineers or provided by other techniques (e.g., based on data from other sensor systems). The training dataset can include beam vectors of radar data similar to those input to the machine-learned model 122 during the operation of vehicle 102.

The machine-learned model 122 can be trained offline, e.g., at a training computing system, and then provided for storage and implementation at one or more computing devices. For example, the training computing system can include a model trainer. The training computing system can be included in or separate from the computing device implementing the machine-learned model 122. The training of the machine-learned model 122 is described in greater detail with respect to FIG. 6.

The machine-learned model 122 can implement logistic regression, a decision tree, or a multi-layer perceptron. These types of machine-learned models may be chosen if the processor 116 has relatively limited processing capabilities. If the processor 116 has greater processing capabilities, additional types of models may be employed. Logistic regression generally uses a Sigmoid function to map the final output into an interval between zero and one, representing the probability of the input being in each category (e.g., single-object or multiple-object scenario). The extracted features and polynomial features may be used to improve the performance of logistic regression. Decision trees use a white-box model to show which extracted features are important in the classification. For example, the depth of the decision tree for the machine-learned model 122 can be set as three. A multi-layer perceptron is a feed-forward neural network that uses linear combinations of the features and a non-linear activation function to generate the classification output. Weights of the activation function are updated or learned iteratively using a gradient-based optimization method (e.g., via backpropagation) during the training phase. For example, the machine-learned model 122 can use one hidden layer with five neurons. The complexity (e.g., number of polynomial features, depth of the decision tree, or number of neurons) of the chosen machine-learned model can be optimized based on the processing capability of the processor 116 and the desired classification accuracy.

As an illustrative implementation, FIG. 1 illustrates vehicle 102 traveling on roadway 106. The radar system 104 detects the objects 110. The radar system 104 processes radar data to generate beam vectors thereof and extracts features associated with the beam vectors. As described above, vehicle 102 can also include at least one automotive system that relies on data from the radar system 104, such as a driver-assistance system, an autonomous-driving system, or a semi-autonomous-driving system. The radar system 104 can include an interface to an automotive system that relies on the data. For example, the processor 116 outputs, via the interface, a signal based on EM energy received by the receiver 114.

Generally, automotive systems use radar data provided by the radar system 104 to perform a function. For example, the driver-assistance system can provide blind-spot monitoring and generate an alert that indicates a potential collision with the objects 110. The radar data can also indicate when it is safe or unsafe to change lanes. The autonomous-driving system may move vehicle 102 to a particular location on roadway 106 while avoiding collisions with the objects 110. The radar data provided by the radar system 104 can also provide information about the distance to and the location of the objects 110 to enable the autonomous-driving system to perform emergency braking, perform lane changes, or adjust the speed of vehicle 102.

Vehicle Configuration

Figure 2:
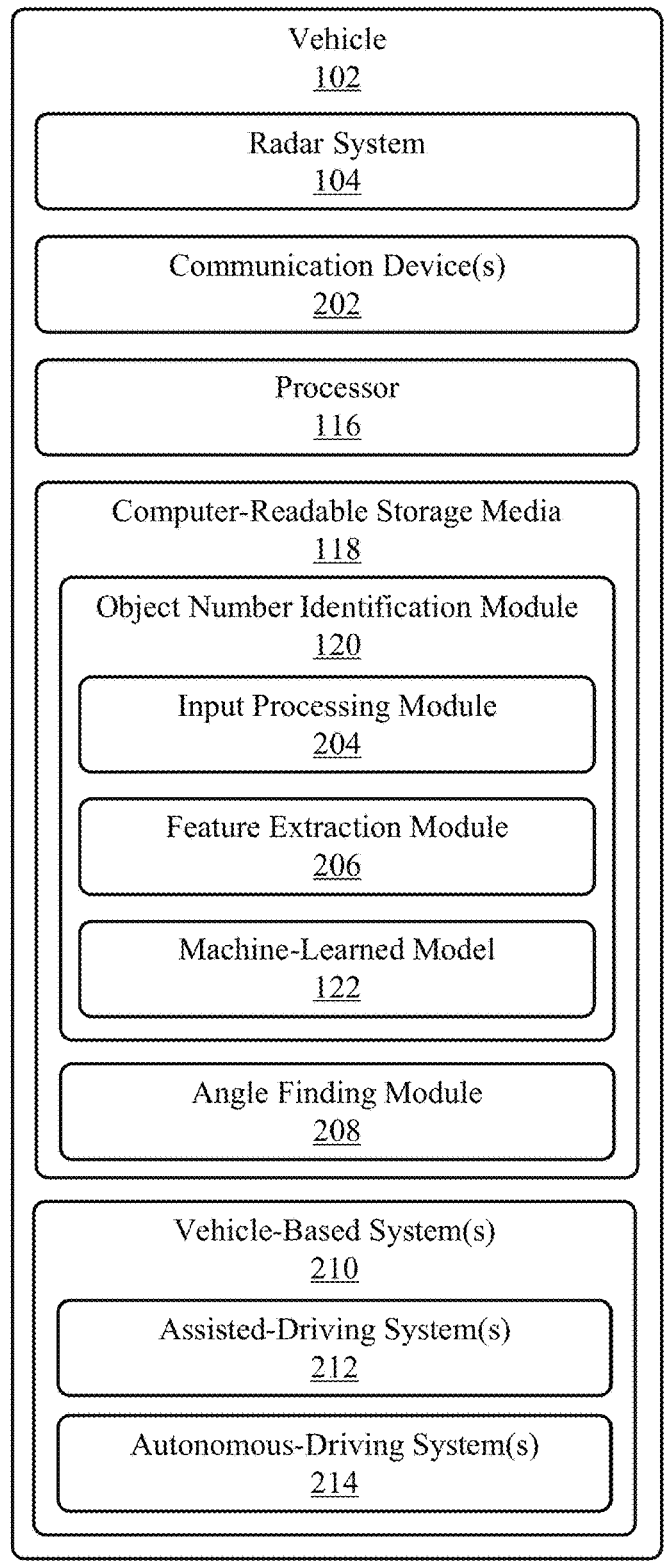
FIG. 2 illustrates an example configuration of a vehicle with a radar system that uses a machine-learned model to identify a number of objects.

FIG. 2 illustrates an example configuration of the vehicle 102 with the radar system 104 that uses the machine-learned model 122 to identify a number of objects. As described with respect to FIG. 1, the vehicle 102 can include the radar system 104, the processor 116, the CRM 118, the object number identification module 120, and the machine-learned model 122. The vehicle 102 can also include one or more communication devices 202, an angle finding module, and one or more vehicle-based systems 210.

The communication devices 202 can include a sensor interface and a vehicle-based system interface. The sensor interface and the vehicle-based system interface can transmit data over a communication bus of the vehicle 102, for example, when the individual components of the object number identification module 120 are integrated within the vehicle 102.

The object number identification module 120 can also include an input processing module 204 and a feature extraction module 206. The input processing module 204 can receive radar data from the receiver 114 as an input. Generally, the radar data is received as raw data output from an analog-to-digital converter. The radar data can be processed (e.g., interference detection, interference mitigation, fast-time processing, slow-time processing, integration, thresholding, peak detection, and/or peak estimation) by input processing module 204 to provide better detection resolution and generate beam vectors to facilitate extracting features associated with the radar data of the beam vectors. In particular, the input processing module 204 can process the radar data to generate beam vectors from which the features for the machine-learned model 122 may be extracted. For example, the beam vectors associated with a single object differ in magnitude variation, SNR, and sub-array beam vector correlations in comparison to beam vectors associated with multiple objects.

The feature extraction module 206 can process the beam vectors to extract features associated with the radar data. As described above, the features may include at least one of magnitude variation, SNR, and subarray beam vector correlations. The feature extraction module 206 may also perform additional processing to extract additional features associated with the beam vectors. The feature extraction module 206 then inputs the features into the machine-learned model 122 to determine the number of detected objects for each range-Doppler bin of a range-Doppler map. The machine-learned model 122 outputs the number of detected objects for each range-Doppler bin to the angle finding module 208. In other implementations, the feature extraction module 206 is implemented as part of the machine-learned model 122.

The angle finding module 208 can perform additional processing to determine an angle (e.g., azimuth angle, elevation angle) associated with each object 110. The angle finding module 208 can utilize a different angle-finding technique based on the number of objects identified for a particular range-Doppler bin. For example, if a single object is identified by the machine-learned model 122 for a particular range-Doppler bin, the angle finding module 208 may use an FFT beamforming technique to determine the angle associated with the single object. If multiple objects are identified by the machine-learned model 122 for a particular range-Doppler bin, the angle finding module 208 may use a super-resolution technique to determine the angles associated with the multiple objects. The angle finding module 208 can then provide the angle determinations to the vehicle-based systems 210.

The vehicle 102 also includes the vehicle-based systems 210, such as an assisted-driving system 212 and an autonomous-driving system 214, that rely on data from the radar system 104, including the angles provided by the angle finding module 208, to control the operation of the vehicle 102 (e.g., braking, lane changing). Generally, the vehicle-based systems 210 can use data provided by the object number identification module 120 to control the operations of vehicle 102 and perform certain functions. For example, the assisted-driving system 212 can alert a driver of objects 110 and perform evasive maneuvers to avoid a collision with objects 110. As another example, the autonomous-driving system 214 can navigate the vehicle 102 to a particular destination to avoid a collision with objects 110.

Object-Number Identification

Figure 3:
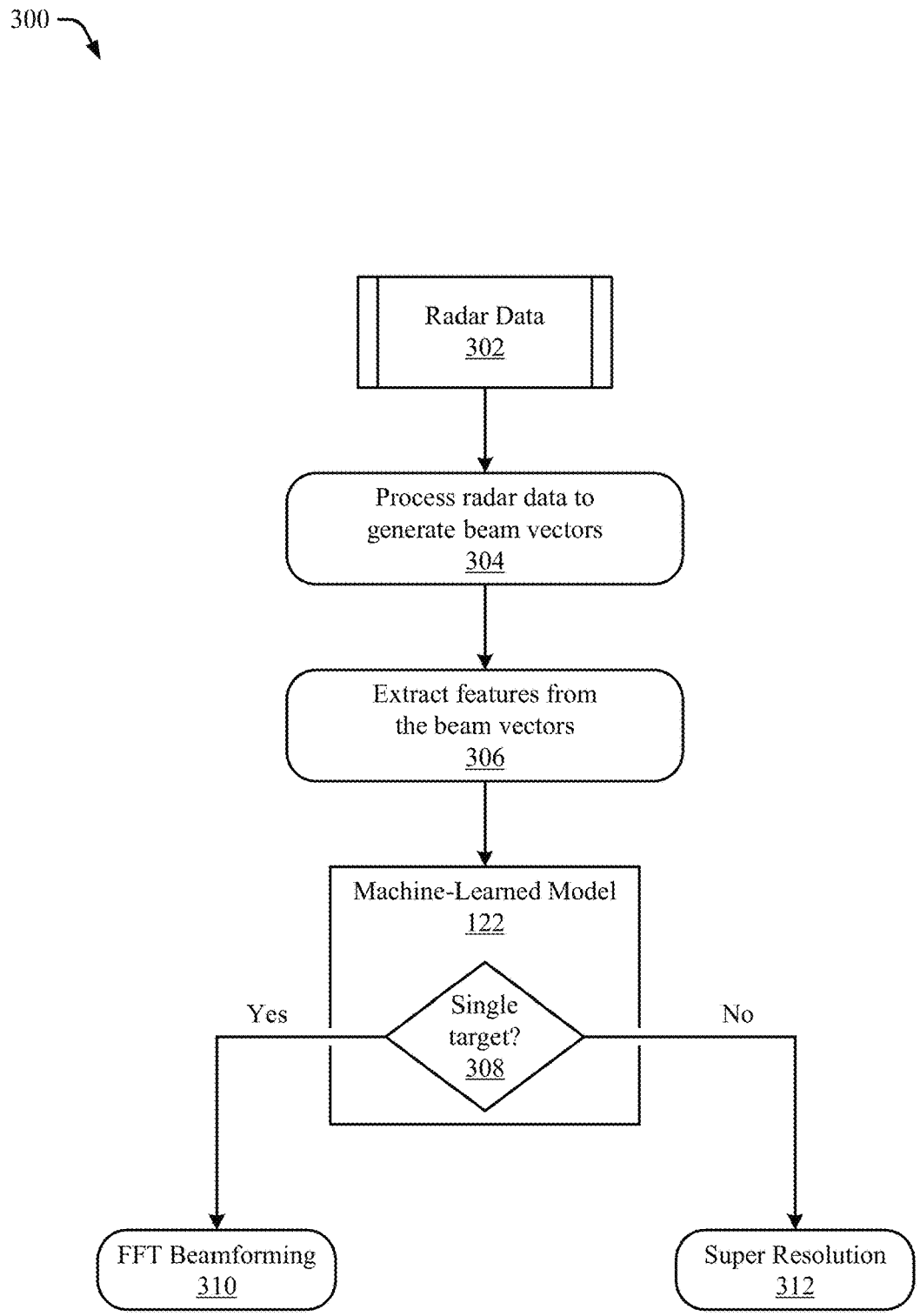
FIG. 3 illustrates an example conceptual diagram of a radar system that uses a machine-learned model to identify a number of objects.

FIG. 3 illustrates an example conceptual diagram 300 of a radar system 104 that uses a machine-learned model 122 to identify a number of objects. As described with respect to FIG. 2, the vehicle 102 can include the input processing module 204, the feature extraction module 206, and the angle finding module 208 of the object number identification module 120. The conceptual diagram 300 illustrates example inputs, outputs, and operations of the object number identification module 120, but the object number identification module 120 is not necessarily limited to the order or combinations in which the inputs, outputs, and operations are shown herein. Further, any one or more of the operations may be repeated, combined, or reorganized to provide other functionality.

The radar system 104 provides time-series frames of EM energy as radar data 302 to the input processing module 204. The radar data 302 may be low-level radar data or point-cloud radar data. The radar data 302 includes information associated with the objects 110 in multiple dimensions, including range space, Doppler space, elevation space, and azimuth space.

At operation 304, the input processing module 204 performs initial processing on the radar data 302 to generate beam vectors (e.g., Doppler beam vectors). The beam vectors can encompass all ranges and Doppler bins and include intensity data related to nearby objects (e.g., both stationary and moving objects) fused together. In particular, the beam vectors include radar from multiple channels for multiple range-Doppler bins of a range-Doppler map. The input processing module 204 may perform additional processing on the beam vectors to separate the intensity data related to the various detected objects.

At operation 306, the feature extraction module 206 extracts features from the beam vectors. For example, the feature extraction module 206 may analyze the beam vectors to determine values for a magnitude variation ($err_{mag}$) and subarray beam vector correlations ($BV_{corr}$). The magnitude variation may be determined using Equations (1) and (2):

$$err_{mag} = \frac{\sum_{i=1}^{n} ||BV_i| - \text{mean}_{mag}|}{n-1} \qquad (1)$$

where $$\text{mean}_{mag} = \frac{\sum_{i=1}^{n} |BV_i|}{n} \qquad (2)$$

and n represents the number of elements in a respective beam vector and $BV_i$ represents the ith element in the respective beam vector. The subarray beam vector correlations may be determined using Equation (3):

$$BV_{corr} = \sqrt{1 - \left(\frac{\|BV_{subarray,j} BV_{subarray,k}\|}{\|BV_{subarray,j}\| \|BV_{subarray,k}\|}\right)^2} \qquad (3)$$

where $BV_{subarray,j}$ and $BV_{subarray,k}$ represent the subarray beam vector from a certain channel. For example, $BV_{corr,1}$ represents the correlation between the subarray from a first channel (e.g., TX1) and the subarray from a second channel (e.g., TX2). Similarly, $BV_{corr,2}$ represents the correlation between the subarray from a first channel (e.g., TX1) and the subarray from a third channel (e.g., TX3). Because the magnitude variation and the subarray beam vector correlations vary with SNR, SNR is also extracted as a feature for use by the machine-learned model 122 to determine the number of detected objects in a respective range-Doppler bin.

At operation 308, the machine-learned model 122 can then determine whether a single target or object is present in a particular range-Doppler bin. To perform the binary classification between a single-object scenario or multiple-object scenario, the machine-learned model 122 can use a logistic regression technique, decision tree approach, or multi-layer perceptron approach.

The logistic regression approach uses a Sigmoid function to map the final output into the interval between 0 and 1, representing the probability of each beam vector being in each category so that proper output class labels can be determined. The logistic regression approach may use weights associated with each feature and polynomial features to improve the performance of the machine-learned model 122.

The decision tree approach is a white box model that shows what features are important in the classification. In this case, the maximum depth of the decision tree may be set to three because sufficient accuracy is obtained with up to three decision levels. The decision tree approach compares various feature values for a respective beam vector against condition values to determine a single-object or multiple-object classification.

The multi-layer perceptron approach is a type of feed-forward neural network that uses linear combinations of the features and a non-linear activation function to generate the classification through layers, where the weights are updated or learned iteratively using a gradient-based optimization method (e.g., via backpropagation during a training phase). In this case, the multi-layer perceptron approach can use one hidden layer with five neurons to obtain a desired level of accuracy. If greater accuracy or complexity is needed or desired, then additional layers or neurons may be implemented.

The machine-learned model 122 can also use pre-trained deep learning models within the convolutional neural network to extract features and feed the extracted features into one of the model or approaches mentioned above that is trained to identify the number of objects present.

If a single object is present for a particular range-Doppler bin, then at operation 310, the angle finding module 208 uses a FFT beamforming approach to determine the angle (e.g., azimuth angle) associated with the single object. If multiple objects are present, then at operation 312, the angle finding module 208 uses a super resolution approach to determine the angle (e.g., azimuth angle) associated with each object of the multiple objects.

Figure 4:
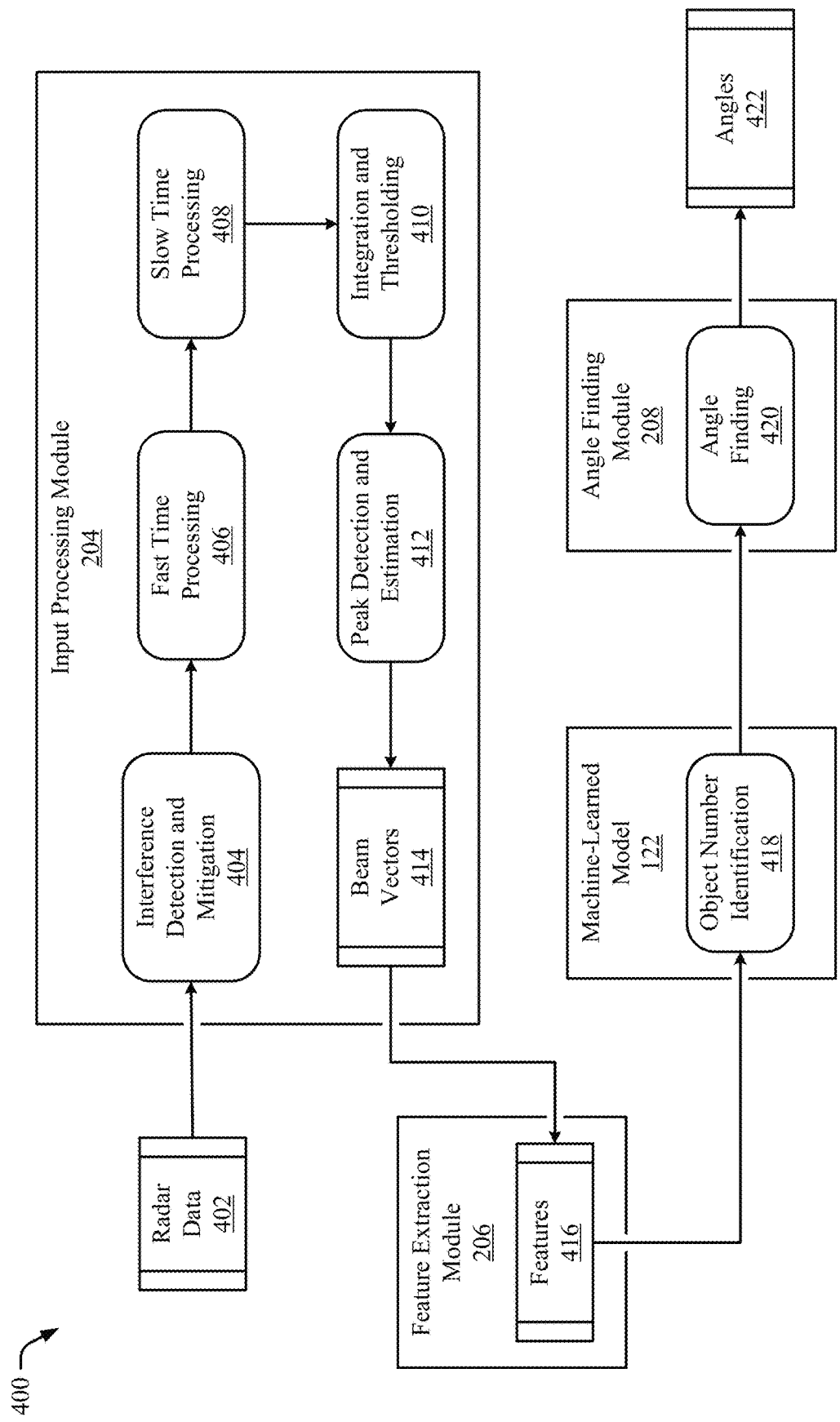
FIG. 4 illustrates an example block diagram of processing radar signals as part of a radar system that uses a machine-learned model to identify a number of objects.

FIG. 4 illustrates an example block diagram 400 of signal processing as part of a radar system that uses a machine-learned model to identify a number of objects. For example, the radar system of FIG. 4 can be the radar system 104 of FIGS. 1 through 3.

The radar system 104 provides time-series frames of EM energy as radar data 402 to the input processing module 204. Radar data 402 may be low-level radar data that generally include more information than point-cloud data. Because the object number identification module 120 uses the radar data 402, it does not require additional input data from other sensors (e.g., a camera or lidar system) to identify the number of objects in a particular range-Doppler bin. Radar data 402 includes information associated with the objects 110 in multiple dimensions, including range space, Doppler space, elevation space, and azimuth space.

At operation 404, the input processing module 204 performs interference detection and mitigation on the radar data 402. Interference in the radar data 402 can be introduced by other radar systems having a similar center frequency as that of the signal transmitted by the radar system 104. The input processing module 204 can analyze the radar data 402 to detect such interference and apply different techniques to mitigate the interference.

At operation 406, the input processing module 204 performs fast time processing on the radar data 402. For example, the input processing module 204 can apply a Fourier transform (e.g., a fast Fourier transform or a discrete Fourier transform) in the fast-time dimension (e.g., the dimension of the sampling points within the radar data 402 within a chirp) to resolve the frequency change.

At operation 408, the input processing module 204 performs slow time processing on the radar data 402. For example, the input processing module 204 can apply a Fourier transform (e.g., a fast Fourier transform or a discrete Fourier transform) in the slow-time dimension (e.g., the dimension of the chirp index within one frame of the radar data 402) to resolve the phase change. As a result of the fast time and slow time processing, the input processing module 204 can obtain a complex-valued data matrix that may be referred to as a range-Doppler map.

At operation 410, the input processing module 204 performs integration and thresholding. For example, the input processing module 204 can coherently integrate the range-Doppler map along a virtual receiver dimension to increase the SNR. Thresholding can also be applied to remove certain data or noise.

At operation 412, the input processing module 204 performs peak detection and estimation. For example, the input processing module 204 may apply a constant false alarm rate detector to detect peaks in the range-Doppler map(s). The input processing module 204 can then apply a Fourier transfer (e.g., fast Fourier transform) over a channel dimension of the radar data 402 for a particular range-Doppler bin to generate the beam vectors 414. The beam vectors 414 may correspond to the complex response of the antenna array elements or virtual array elements.

The feature extraction module 206 then extracts, using the beam vectors 414, features 416 of the radar data 402. As described above, the features 416 include a magnitude variation, SNR, first subarray beam vector correlation, and second subarray beam vector correlation. At operation 418, the machine-learned model 122 then uses the features 416 and the beam vectors 414 to classify each range-Doppler bin as a single-object or multiple-object scenario, thus identifying the number of objects for each range-Doppler bin.

At operation 420, the angle finding module 208 performs angle finding and outputs angles 422 associated with the objects 110. If a particular range-Doppler bin is identified as a single-object scenario, the angle finding module 208 applies a FFT technique to determine the angle 422 (e.g., azimuth angle) with the object 110. If the range-Doppler bin is classified as a multiple-object scenario, the angle finding module 208 applies a super resolution technique to determine the angles 422 associated with the objects 110. In other implementations, the angle finding module 208 may use different angle-finding techniques for the single-object and/or multiple-object scenarios.

Figure 5:
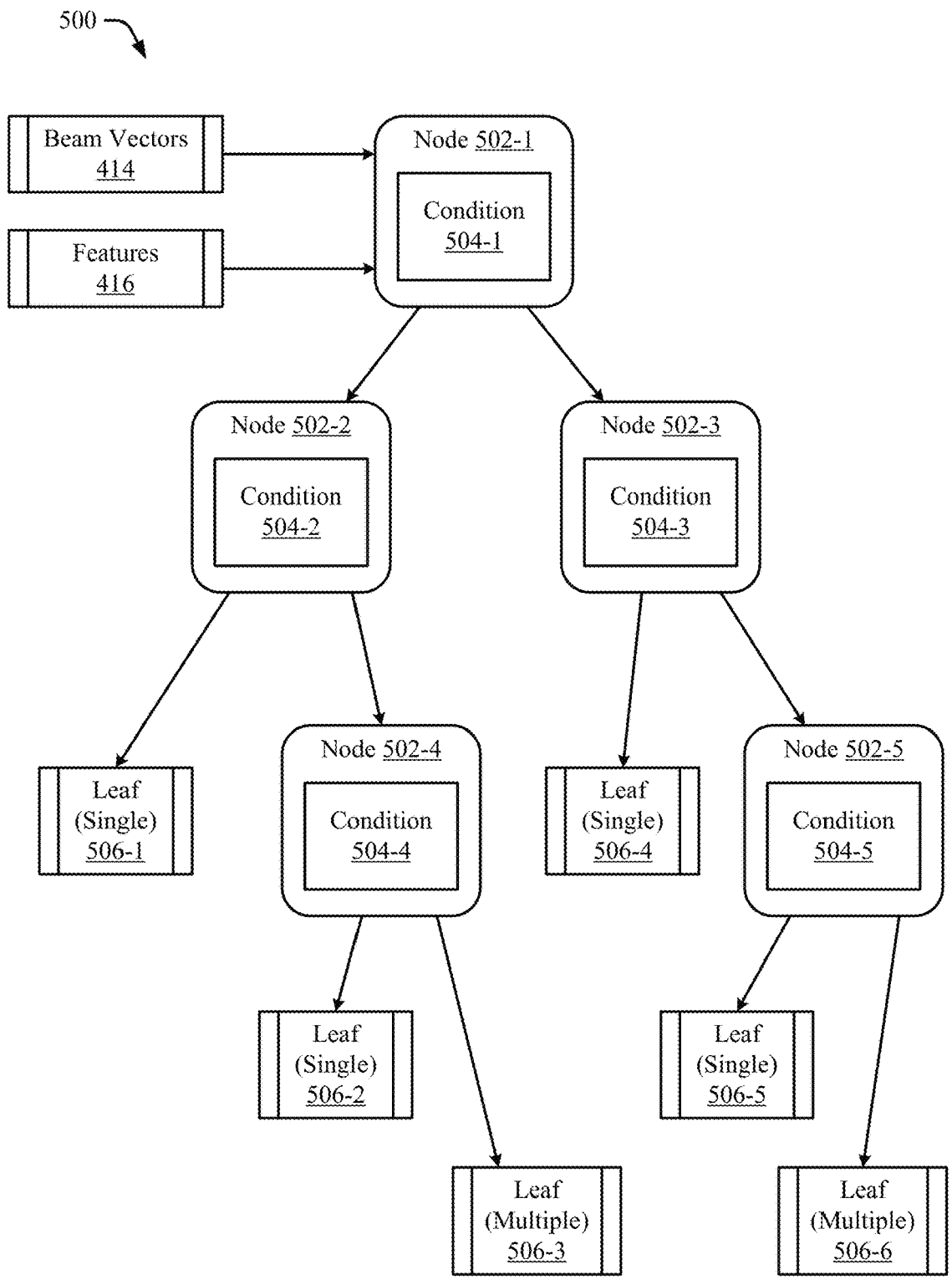
FIG. 5 illustrates an example conceptual diagram of a decision tree machine-learned model for identifying a number of objects, in accordance with techniques of this disclosure.

FIG. 5 illustrates an example conceptual diagram of a decision tree machine-learned model 500 for identifying a number of objects in each range-Doppler bin. The illustrated decision tree machine-learned model 500 can, for example, be the machine-learned model 122 of FIGS. 1 through 4. The conceptual diagram illustrates example operations, nodes, edges, and decisions (or leaves) of the decision tree machine-learned model 500, but the decision tree machine-learned model 500 is not necessarily limited to the order or combinations in which the operations, nodes, edges, and decisions are shown herein.

Inputs to the decision tree machine-learned model 500 include the beam vectors 414 and the features 416. As illustrated in FIG. 5, the decision tree machine-learned model 500 includes up to three levels or has a maximum depth of three. The number of levels can be decreased or increased depending on processing capabilities or desired accuracy. The object number identification module 120 uses the decision tree machine-learned model 500 to classify the input beam vectors 414 for a particular range-Doppler bin as a single-object or multiple-object scenario. The decision tree machine-learned model 500 is designed to split each node into two additional nodes or leaves.

At a first node 502-1, the decision tree machine-learned model 500 considers a first condition 504-1 of the features 416. For example, the first condition 504-1 may be whether the first subarray beam vector correlation, $BV_{corr,1}$, is less than or equal to a first threshold value (e.g., 0.2). In other implementations, the first condition 504-1 may assess a different feature, use a different threshold value, or use a different mathematical operator (e.g., greater than).

If the first subarray beam vector correlation, $BV_{corr,1}$, is less than or equal to the first threshold value, then the decision tree machine-learned model 500 proceeds to a second node 502-2. At the second node 502-2, the decision tree machine-learned model 500 considers a second condition 504-2 of the features 416. For example, the second condition 504-2 may be whether the second subarray beam vector correlation, $BV_{corr,2}$, is less than or equal to a second threshold value (e.g., 0.2). In other implementations, the second condition 504-2 may assess a different feature, use a different threshold value, or use a different mathematical operator (e.g., greater than).

If the second subarray beam vector correlation, $BV_{corr,2}$, is less than or equal to the second threshold value, then the decision tree machine-learned model 500 proceeds to a first leaf 506-1 that the associated beam vector 414 is a single-object scenario.

Returning to the second node 502-2, if the second subarray beam vector correlation, $BV_{corr,2}$, is greater than the second threshold value, then the decision tree machine-learned model 500 proceeds to a fourth node 502-4. At the fourth node 502-4, the decision tree machine-learned model 500 considers a fourth condition 504-4 of the features 416. For example, the fourth condition 504-4 may be whether the SNR is less than or equal to a fourth threshold value (e.g., 20). In other implementations, the fourth condition 504-4 may assess a different feature, use a different threshold value, or use a different mathematical operator (e.g., greater than). If the SNR is less than or equal to the fourth threshold value, then the decision tree machine-learned model 500 proceeds to a second leaf 506-2 that the associated beam vector 414 is a single-object scenario. If the SNR is greater than the fourth threshold value, then the decision tree machine-learned model 500 proceeds to a third leaf 506-3 that the associated beam vector 414 is a multiple-object scenario.

Returning to the first node 502-1, if the first subarray beam vector correlation, $BV_{corr,1}$, is greater than the first threshold value, then the decision tree machine-learned model 500 proceeds to a third node 502-3. At the third node 502-3, the decision tree machine-learned model 500 considers a third condition 504-3 of the features 416. For example, the third condition 504-3 may be whether the SNR is less than or equal to a third threshold value (e.g., 14). In other implementations, the third condition 504-3 may assess a different feature, use a different threshold value, or use a different mathematical operator (e.g., greater than). If the SNR is less than or equal to the third threshold value, then the decision tree machine-learned model 500 proceeds to a fourth leaf 506-4 that the associated beam vector 414 is a single-object scenario.

If the SNR is greater than the third threshold value, then the decision tree machine-learned model 500 proceeds to a fifth node 502-5. At the fifth node 502-5, the decision tree machine-learned model 500 considers a fifth condition 504-5 of the features 416. For example, the fifth condition 504-5 may be whether the magnitude variation ($err_{mag}$) is less than or equal to a fifth threshold value (e.g., 0.1). In other implementations, the fifth condition 504-5 may assess a different feature, use a different threshold value, or use a different mathematical operator (e.g., greater than). If the magnitude variation ($err_{mag}$) is less than or equal to the fifth threshold value, then the decision tree machine-learned model 500 proceeds to a fifth leaf 506-5 (e.g., decision, classification) that the associated beam vector 414 is a single-object scenario. If the magnitude variation ($err_{mag}$) is greater than the fifth threshold value, then the decision tree machine-learned model 500 proceeds to a sixth leaf 506-6 (e.g., decision, classification) that the associated beam vector 414 is a multiple-object scenario.

Figure 6:
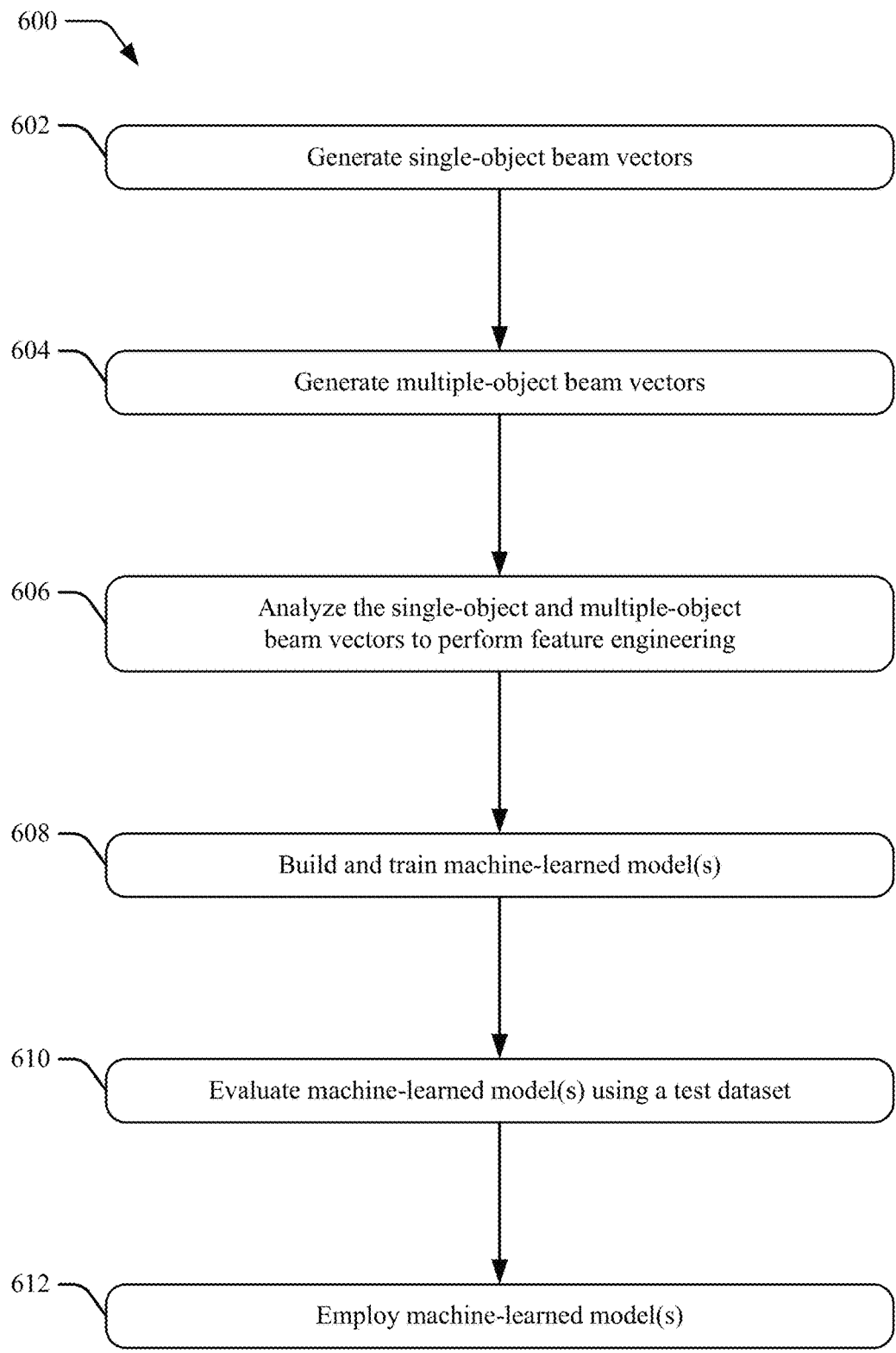
FIG. 6 illustrates an example flow diagram for training a machine-learned model of a radar system to identify a number of objects, in accordance with techniques of this disclosure.

FIG. 6 illustrates an example flow diagram 600 for training the machine-learned model 122 to identify a number of objects. In particular, the flow diagram 600 illustrates the feature extraction and labeling process of the object number identification module 120 or another module of a computer system to train the machine-learned model 122. Flow diagram 600 illustrates example inputs, outputs, and operations, but flow diagram 600 is not necessarily limited to the order or combinations in which the inputs, outputs, and operations are shown herein. Further, any of one or more of the operations may be repeated, combined, or reorganized to provide other functionality.

At operation 602, engineers prepare or generate single-object beam vectors. For example, high SNR beam vectors of a single-corner reflector at different azimuth and elevation angles may be collected using radar systems in chambers and wide-open spaces. The elevation angle may vary between negative twelve degrees to positive twelve degrees relative to the radar system. The azimuth angle may vary from negative ninety degrees to positive ninety degrees relative to the radar system. Then single-target beam vectors of different SNRs (e.g., from 8 dB to 70 dB SNR) may be generated by perturbing the high-SNR beam vectors with Gaussian noise.

At operation 604, engineers prepare or generate multiple-object beam vectors. For example, high SNR beam vectors of two-corner reflectors with different separations (e.g., different azimuth and elevation angles) and dynamic ranges may be collected using radar systems in chambers and wide-open spaces. In other implementations, additional corner reflectors may be used to generate additional types of multiple-object beam vectors. The elevation angle may vary between negative four degrees to positive four degrees relative to the radar system. The azimuth angle of a first object or target may vary from negative seventy-five degrees to positive seventy-five degrees relative to the radar system (s). The azimuth angle of a second object or target relative to the first object (e.g., separation angle) may vary from four degrees to fifteen degrees. Then two-target beam vectors of different SNRs (e.g., from 16 dB to 70 dB SNR) may be generated by perturbing the high-SNR beam vectors with Gaussian noise. The dynamic range of the two-object beam vectors may vary from −12 dB to 12 dB. A subset of the single-object beam vectors may also be linearly combined to create two-object beam vectors to create additional samples or training data.

At operation 606, the single-object and multiple-object beam vectors are analyzed to perform feature engineering. For example, engineers or computer systems may analyze the single-object and two-object beam vectors to identify differentiating features or characteristics among the different types of beam vectors. As discussed above, the features may include the magnitude variation ($err_{mag}$), SNR, first subarray beam vector correlation ($BV_{corr,1}$), and second subarray beam vector correlation ($BV_{corr,2}$). Additional features associated with the single-object and multiple-object beam vectors may also be extracted.

At operation 608, the machine-learned model 122 is trained and built. For example, the machine-learned model 122 may be implemented as a logistic regression model, decision tree model, or multi-layer perceptron model. A subset (e.g., seventy percent) of the beam vectors generated in operations 602 and 604 may be used to train the machine-learned model. Another subset (e.g., thirty percent) of the beam vectors may be used to test or validate the machine-learned model 122.

The machine-learned model 122 can be trained offline or online. In offline training (e.g., batch learning), the machine-learned model 122 is trained on a static training data set. In online training, the machine-learned model 122 is continuously trained (or re-trained) as new training data become available (e.g., while the machine-learned model 122 is used to perform object number identification).

Centralized training of multiple machine-learned models 122 (e.g., based on a centrally stored dataset) may be performed. In other implementations, the trainer can use decentralized training techniques, including distributed training or federated learning, to train, update, or personalize the machine-learned model 122.

At operation 610, the machine-learned model(s) 122 are evaluated using a test dataset. For example, the machine-learned model(s) 122 may be evaluated against an existing algorithm using the same single-object and two-object beam vectors to analyze their accuracy. In an illustrative example, the accuracy of correctly identifying the number of objects in a particular range-Doppler bin improved from about sixty percent to about ninety-six percent.

At operation 612, the machine-learned model(s) 122 are employed. For example, one of the machine-learned model(s) 122 is implemented, integrated, or employed in the radar system 104 of the host vehicle 102. In this way, the machine-learned model(s) 122 improves the classification accuracy between single-object and multiple-object scenarios, thus improving the computational efficiency of angle finding module 208 and reducing false detections and angle jumps. In addition, the machine-learned model 122 can be implemented in low-end processors with limited processing capacity.

Example Method

Figure 7:
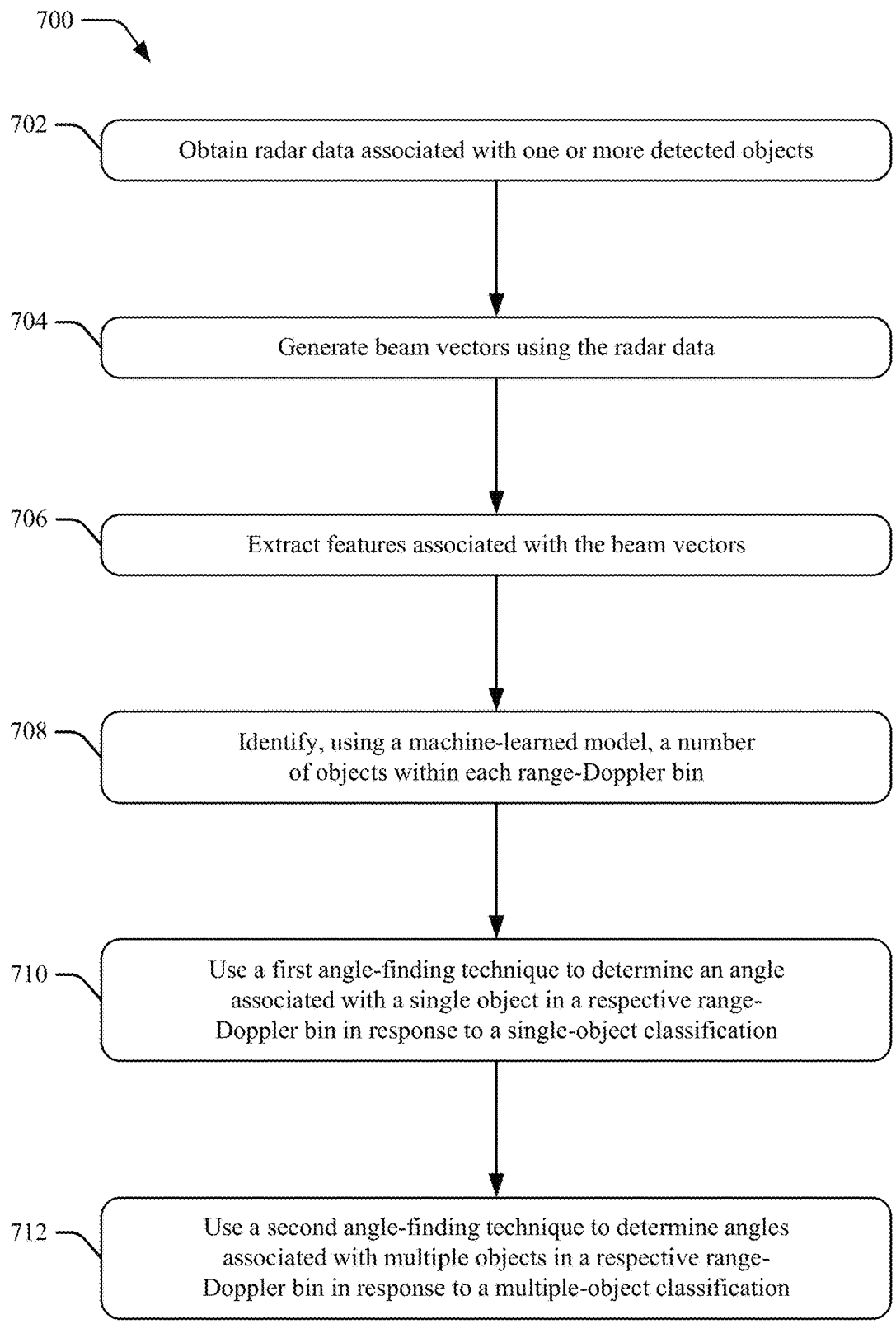
FIG. 7 illustrates a flow diagram of an example method of a radar system that uses a machine-learned model for identifying a number of objects in accordance with techniques of this disclosure.

FIG. 7 illustrates a flow diagram of an example method 700 of a radar system 104 that uses a machine-learned model 122 for identifying the number of objects. Method 700 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1 and entities detailed in FIGS. 1 through 6, reference to which is made for example only. The techniques are not limited to performance by one entity or multiple entities.

At operation 702, radar data associated with one or more detected objects is obtained. For example, the processor 116 is configured to identify the number of objects 110 within each range-Doppler bin. The processor 116 obtains from the radar system 104 radar data associated with the objects 110 that reflected radar signals. As described above, the radar system 104 and the processor 116 are integrated in or installed in the vehicle 102.

At operation 704, multiple beam vectors are generated using the radar data. For example, the processor 116 processes the radar data to generate the beam vectors 414. Each beam vector 414 includes radar data from multiple channels for a respective range-Doppler bin. As part of the processing, the processor 116 may perform at least one of interference detection and mitigation, fast-time processing, slow-time processing, integration and threshold, or peak estimation as described in greater detail with respect to FIG. 4.

At operation 706, multiple features of the radar data associated with the beam vectors are extracted. For example, the feature extraction module 206 analyzes the beam vectors 414 to extract the features 416 for each respective beam vector 414 of the multiple beam vectors 414. The features 416 may include a magnitude variation, a signal-to-noise ratio, a first subarray beam vector correlation, and a second subarray beam vector correlation. The feature extraction module 206 may be implemented as a separate module or as part of the machine-learned model 122.

At operation 708, the number of detected objects within each range-Doppler bin is identified using a machine-learned model. For example, the machine-learned model 122 uses the features 416 to identify the number of objects 110 detected within each range-Doppler bin. The machine-learned model 122 determines whether a single object or multiple objects are present in a particular range-Doppler bin using the multiple features 416 associated with the respective beam vector 414. In one example implementation, the machine-learned model 122 may be a logistic regression model with weights associated with each feature 416 of the multiple features 416 and other weights associated with polynomial features of the multiple features 416. In another example implementation, the machine-learned model 122 is a decision tree model that compares a feature value of a respective beam vector 414 to a condition value at each decision or node of the decision tree. In yet another implementation, the machine-learned model 122 is a multi-layer perceptron model that uses linear combinations of the multiple features and a non-linear activation function. The type of complexity of the machine-learned model 122 may be determined or selected based on a processing capability of the processor 116 of the radar system 104.

As described with respect to FIG. 6, the machine-learned model 122 is trained using ground truth data. The ground truth data includes beam vectors for single-object and multiple-object (e.g., two-object) scenarios. The ground truth data may be collected using corner reflectors in a controlled environment (e.g., chambers and wide-open spaces) or from data collected by radar systems in real-world driving scenarios. The truth data may be subjected to feature engineering to determine the relevant features for classifying beam vectors as a single-object or multiple-object scenario.

At operation 710, in response to the output of the machine-learned model classifying the respective range-Doppler bin as having a single object, a first angle-finding technique (e.g., a Fast Fourier transform technique) is used to determine an angle associated with the single object for the respective range-Doppler bin. For example, the angle finding module 208 uses a FFT technique to determine the angle 422 associated with the object 110 in response to the machine-learned model 122 classifying the radar data associated with a particular range-Doppler bin as a single-object scenario. The determined angle 422 may be an azimuth angle and/or an elevation angle for the object 110.

At operation 712, in response to the output of the machine-learned model classifying the respective range-Doppler bin as having multiple objects, a second angle-finding technique (e.g., a super resolution technique) that is different than the first angle-finding technique is used to determine angles associated with the multiple objects for the respective range-Doppler bin. For example, the angle finding module 208 uses a super resolution technique to determine the angles 422 associated with the objects 110 in response to the machine-learned model 122 classifying the radar data associated with a particular range-Doppler bin as a multiple-object scenario. The determined angles 422 may be azimuth angles and/or elevation angles for the objects 110. The super resolution technique may include at least one of an Estimation of Signal Parameters via Rotational Invariance Technique (ESPRIT), a Multiple Signal Classification (MUSIC) technique, an iterative adaptive approach (IAA), or a two-step FFT approach.

The radar system 104 or the processor 116 may also output the angle(s) 422 to an assisted-driving system 212 or autonomous-driving system 214 of the vehicle 102. The assisted-driving system 212 or autonomous-driving system 214 may then operate the vehicle 102 based on the angle(s) 422 associated with the object(s) 110.

The method 700 may optionally retrain or update the machine-learned model 122 with additional ground truth data. For example, an implementation of the machine-learned model 122 can be updated based on additional or new ground truth data obtained and processed at another computing system and/or location during operation of the vehicle 102.

ADDITIONAL EXAMPLES

In the following section, additional examples are provided.

Example 1: A method for identifying a number of objects within each range-Doppler bin of a range-Doppler map, the method comprising: obtaining radar data associated with one or more objects that reflected a radar signal; generating, using the radar data, multiple beam vectors, each respective beam vector including the radar data from multiple channels for a particular range-Doppler bin; extracting, for each respective beam vector of the multiple beam vectors, multiple features of the radar data; identifying, using a machine-learned model for each respective beam vector of the multiple beam vectors, the number of detected objects within the particular range-Doppler bin, the machine-learned model being configured to determine whether a single object or multiple objects are present in the particular range-Doppler bin using the multiple features associated with the respective beam vector; and in response to an output of the machine-learned model classifying the respective range-Doppler bin as having the single object, using a first angle-finding technique to determine an angle associated with the single object for the respective range-Doppler bin; or in response to the output of the machine-learned model classifying the respective range-Doppler bin as having the multiple objects, using a second angle-finding technique to determine angles associated with the multiple objects for the respective range-Doppler bin, the second angle-finding technique being different than the first angle-finding technique.

Example 2: The method of Example 1, the first angle-finding technique is a fast Fourier transform (FFT) beamforming approach; and the second angle-finding technique is a super resolution technique.

Example 3: The method of Example 2, wherein the super resolution technique includes at least one of a multiple signal classification (MUSIC) technique, an estimation of signal parameters via rotational invariance technique (ESPRIT), or an iterative adaptive approach (IAA).

Example 4: The method of any one of the previous Examples, wherein the machine-learned model is a logistic regression model with weights associated with each feature of the multiple features and other weights associated with polynomial features of the multiple features.

Example 5: The method of any one of the previous Examples, wherein the machine-learned model is a decision tree model that compares a feature value of the respective beam vector to a condition value at each decision.

Example 6: The method of any one of the previous Examples, wherein the machine-learned model is a multi-layer perceptron model that uses linear combinations of the multiple features and a non-linear activation function.

Example 7: The method of any one of the previous Examples, wherein the multiple features include a magnitude variation, a signal-to-noise ratio, a first subarray beam vector correlation, and a second subarray beam vector correlation of the multiple beam vectors.

Example 8: The method of any one of the previous Examples, wherein the multiple features are extracted by the machine-learned model.

Example 9: The method of any one of the previous Examples, wherein: the machine-learned model is trained offline using ground truth data, the ground truth data including beam vectors for single-object and multiple-object scenarios; and the multiple features are identified by performing feature engineering on the ground truth data.

Example 10: The method of any one of the previous Examples, wherein the angle is at least one of an elevation angle or an azimuth angle.

Example 11: The method of any one of the previous Examples, wherein the method further comprises: outputting the angle associated with the single object or the angles associated with the multiple objects to an assisted-driving system or autonomous-driving system of a host vehicle; and operating the host vehicle based on the angle associated with the single object or the angles associated with the multiple objects.

Example 12: The method of any one of the previous Examples, wherein a type and complexity of the machine-learned model is determined based on a processing capability of the one or more processors of the radar system.

Example 13: A system comprising: a radar system including one or more processors configured to identify a number of objects within each range-Doppler bin of a range-Doppler map by performing the method of any one of Examples 1 through 12.

Example 14: The system of Example 13, wherein the system is configured to be integrated in or installed in a vehicle.

Example 15: A computer-readable storage media comprising computer-executable instructions that, when executed, cause a processor of a radar system to identify a number of objects within each range-Doppler bin of a range-Doppler map by performing the method of any one of Examples 1 through 12.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:
1. A system comprising:
   a radar system including one or more processors configured to identify a number of objects within each range-Doppler bin of a range-Doppler map by:
      obtaining radar data associated with one or more objects that reflected a radar signal;
      generating, using the radar data, multiple beam vectors, each respective beam vector including the radar data from multiple channels for a particular range-Doppler bin;
      extracting, for each respective beam vector of the multiple beam vectors, multiple features of the radar data;
      identifying, using a machine-learned model for each respective beam vector of the multiple beam vectors, the number of objects within the particular range-Doppler bin, the machine-learned model being configured to determine whether a single object or multiple objects are present in the particular range-

Doppler bin using the multiple features associated with the respective beam vector; and in response to an output of the machine-learned model classifying the respective range-Doppler bin as having the single object, using a first angle-finding technique to determine an angle associated with the single object for the respective range-Doppler bin; or in response to the output of the machine-learned model classifying the respective range-Doppler bin as having the multiple objects, using a second angle-finding technique to determine angles associated with the multiple objects for the respective range-Doppler bin, the second angle-finding technique being different than the first angle-finding technique.

2. The system of claim 1, wherein:
the first angle-finding technique is a fast Fourier transform (FFT) beamforming approach; and
the second angle-finding technique is a super resolution technique.

3. The system of claim 2, wherein the super resolution technique includes at least one of a multiple signal classification (MUSIC) technique, an estimation of signal parameters via rotational invariance technique (ESPRIT), or an iterative adaptive approach (IAA).

4. The system of claim 1, wherein the machine-learned model is a logistic regression model with weights associated with each feature of the multiple features and other weights associated with polynomial features of the multiple features.

5. The system of claim 1, wherein the machine-learned model is a decision tree model that compares a feature value of the respective beam vector to a condition value at each decision.

6. The system of claim 1, wherein the machine-learned model is a multi-layer perceptron model that uses linear combinations of the multiple features and a non-linear activation function.

7. The system of claim 1, wherein the multiple features include a magnitude variation, a signal-to-noise ratio, a first subarray beam vector correlation, and a second subarray beam vector correlation of the multiple beam vectors.

8. The system of claim 1, wherein the multiple features are extracted by the machine-learned model.

9. The system of claim 1, wherein the machine-learned model is trained offline using ground truth data, the ground truth data including beam vectors for single-object and multiple-object scenarios.

10. The system of claim 1, wherein the angle is at least one of an elevation angle or an azimuth angle.

11. The system of claim 1, wherein:
the one or more processors are further configured to output the angle associated with the single object or the angles associated with the multiple objects to an assisted-driving system or autonomous-driving system of a host vehicle; and
the system further comprises the assisted-driving system or autonomous-driving system configured to operate the host vehicle based on the angle associated with the single object or the angles associated with the multiple objects.

12. The system of claim 1, wherein the system is configured to be integrated in or installed in a vehicle.

13. The system of claim 1, wherein a type and complexity of the machine-learned model is determined based on a processing capability of the one or more processors of the radar system.

14. A method for identifying a number of objects within each range-Doppler bin of a range-Doppler map, the method comprising:
obtaining radar data associated with one or more objects that reflected a radar signal;
generating, using the radar data, multiple beam vectors, each respective beam vector including the radar data from multiple channels for a particular range-Doppler bin;
extracting, for each respective beam vector of the multiple beam vectors, multiple features of the radar data;
identifying, using a machine-learned model for each respective beam vector of the multiple beam vectors, the number of detected objects within the particular range-Doppler bin, the machine-learned model being configured to determine whether a single object or multiple objects are present in the particular range-Doppler bin using the multiple features associated with the respective beam vector; and
in response to an output of the machine-learned model classifying the respective range-Doppler bin as having the single object, using a first angle-finding technique to determine an angle associated with the single object for the respective range-Doppler bin; or
in response to the output of the machine-learned model classifying the respective range-Doppler bin as having the multiple objects, using a second angle-finding technique to determine angles associated with the multiple objects for the respective range-Doppler bin, the second angle-finding technique being different than the first angle-finding technique.

15. The method of claim 14, wherein:
the first angle-finding technique is a fast Fourier transform (FFT) beamforming approach; and
the second angle-finding technique is a super resolution technique, the super resolution technique being at least one of a multiple signal classification (MUSIC) technique, an estimation of signal parameters via rotational invariance technique (ESPRIT), or an iterative adaptive approach (IAA).

16. The method of claim 14, wherein the multiple features include a magnitude variation, a signal-to-noise ratio, a first subarray beam vector correlation, and a second subarray beam vector correlation of the multiple beam vectors.

17. The method of claim 14, wherein the method further comprises:
outputting the angle associated with the single object or the angles associated with the multiple objects to an assisted-driving system or autonomous-driving system of a host vehicle; and
operating the host vehicle based on the angle associated with the single object or the angles associated with the multiple objects.

18. The method of claim 14, wherein the multiple features are identified by performing feature engineering on ground truth data, the ground truth data including beam vectors for single-object and multiple-object scenarios.

19. The method of claim 14, wherein the machine-learned model comprises:
a logistic regression model with weights associated with each feature of the multiple features and other weights associated with polynomial features of the multiple features;
a decision tree model that compares a feature value of the respective beam vector to a condition value at each decision; or a multi-layer perceptron model that uses linear combinations of the multiple features and a non-linear activation function.

20. A non-transitory computer-readable storage media comprising computer-executable instructions that, when executed, cause a processor of a radar system to identify a number of objects within each range-Doppler bin of a range-Doppler map by:
   obtaining radar data associated with one or more objects that reflected a radar signal;
   generating, using the radar data, multiple beam vectors, each respective beam vector including the radar data from multiple channels for a particular range-Doppler bin;
   extracting, for each respective beam vector of the multiple beam vectors, multiple features of the radar data;
   identifying, using a machine-learned model for each respective beam vector of the multiple beam vectors, the number of detected objects within the particular range-Doppler bin, the machine-learned model being configured to determine whether a single object or multiple objects are present in the particular range-Doppler bin using the multiple features associated with the respective beam vector; and
   in response to an output of the machine-learned model classifying the respective range-Doppler bin as having the single object, using a first angle-finding technique to determine an angle associated with the single object for the respective range-Doppler bin; or
   in response to the output of the machine-learned model classifying the respective range-Doppler bin as having the multiple objects, using a second angle-finding technique to determine angles associated with the multiple objects for the respective range-Doppler bin, the second angle-finding technique being different than the first angle-finding technique.

* * * * *